(12) United States Patent
Endo et al.

(10) Patent No.: US 6,763,182 B1
(45) Date of Patent: Jul. 13, 2004

(54) RECORDING AND REPRODUCING APPARATUS AND RECORDING MEDIUM

(75) Inventors: Katsumi Endo, Kanagawa (JP); Shiro Miyagi, Tokyo (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 09/538,813

(22) Filed: Mar. 30, 2000

(30) Foreign Application Priority Data

Mar. 31, 1999 (JP) .......................... P11-094155

(51) Int. Cl.[7] .......................... H04N 5/781; H04N 5/85; H04N 5/225
(52) U.S. Cl. .................. 386/124; 386/125; 386/117
(58) Field of Search ..................... 386/124, 125, 386/126, 107, 117, 118, 45, 38, 46, 40, 52, 55, 68, 1, 4, 6, 27, 33, 109, 111, 112; 348/222.1, 231.5, 207.99

(56) References Cited

U.S. PATENT DOCUMENTS 5,633,678 A * 5/1997 Parulski et al. .......... 348/231.5
6,334,025 B1 * 12/2001 Yamagami .................. 386/96

FOREIGN PATENT DOCUMENTS

EP    0 883 066 A2    12/1998
EP    0 907 128 A1    4/1999

* cited by examiner

Primary Examiner—Robert Chevalier
(74) Attorney, Agent, or Firm—Lerner, David, Littenberg, Krumholz & Mentlik, LLP

(57) ABSTRACT

Digital data of plural categories need to be reproduced chronologically in a simplified manner. A memory card can be mounted on or dismounted from a digital camera device and records the digital data of plural categories. The data of the respective categories are stored under a dedicated subdirectory. In recording, the digital camera device generates serial numbers in the data recording sequence, without dependency upon the categories, and records the digital data with the filename including the serial number. In reproduction, the digital data is reproduced in the sequence of the serial numbers included in the filename without dependency upon the categories.

28 Claims, 5 Drawing Sheets

| | |
|---|---|
| DSC00001.JPG | DSC00001.JPG |
| DSC00002.JPG | DSC00002.JPG |
| DSC00005.JPG | MOV00003.MPG |
| DSC00006.JPG | MOV00004.MPG |
| | DSC00005.JPG |
| MOV00003.MPG | DSC00006.JPG |
| MOV00004.MPG | MOV00007.MPG |
| MOV00007.MPG | |

FIG.4A   FIG.4B

RECORDING AND REPRODUCING APPARATUS AND RECORDING MEDIUM

FIELD OF THE INVENTION

This invention relates to a removable recording medium on which data of plural categories, such as, for example, audio data and video data, are recorded, and a recording and reproducing apparatus for recording digital data on this recording medium.

BACKGROUND OF THE INVENTION

In many recording and reproducing apparatuses, a removable recording medium is used. One advantage of such a removable recording medium is the ability to allow the digital data on the removable recording media to be processed directly by a computer. To further facilitate this advantage, the digital data is stored on the removable recording medium in a directory structure and file format that can be processed by a computer system. For example, a digital camera will store its still image digital data in a memory card, such as a flash RAM memory card, in a directory structure that a standard IBM PC compatible computer can access given the correct driver, and in a file format commonly used by a PC to store such image data, such as the JPEG file format.

Some recording and reproducing apparatus, which have hitherto been able to record and reproduce only data of one category, are now able to record and reproduce data of plural categories. Such categories include still image, audio, and video. This change in the art is a result of developments in the digital data processing field in recent years, and also of the development of increasing recording capacity of removable recording media. For example, formerly a digital camera could record only still image data. Now a new digital camera may be able to record moving picture or video data in addition to still image data, and may even have a microphone to record audio data.

In these recording and reproducing apparatus capable of recording and reproducing data of plural categories, a new problem arises. The different digital data categories, such as still image, audio, and video, will each have one or more particular file formats. Specific apparatuses may be able to mount the removable recording medium, but only access and process one category of data. For example, a new digital camera may record still image, audio, and video data on a removable recording medium. However, an audio player may only be able to process audio files, even though it is able to mount the particular removable recording medium. Thus, the plethora of data categories on the removable recording medium could render such an audio player unable to find or access the audio files. Moreover, a program on a personal computer will often only deal with a specific data category, or even a specific file format, and may have the same problem of accessing data on a removable recording medium with multiple data categories on it. In order to address this potential compatibility problem, a recording and reproducing apparatus capable of recording and reproducing data of plural categories is provided. It can record data of different categories in different directories on the removable recording medium. Each particular digital data category can have a corresponding directory. This allows apparatuses or programs the option to access a predetermined directory containing only one category of data. Subdirectories can be used to further categorise specific file formats under category directories.

This solution presents a new problem. If a recording and reproducing apparatus capable of recording and reproducing data of plural categories records data in different directories, it is not recording data in a list format which mirrors the chronological order in which the data was recorded. A problem presents itself if data on the removable recording medium needs to be accessed in chronological order rather than in categorical order, or if any time comparison must be done between data of different categories, In view of the above-described status of the art, it is an object of the present invention to provide a recording and reproducing apparatus in which digital data of plural categories can be recorded onto a recording medium in categories but reproduced chronologically. Another object of the present invention is to provide a recording medium in which recorded digital data of plural categories can be reproduced chronologically.

SUMMARY OF THE INVENTION

One aspect of the present invention provides a recording and reproducing apparatus for recording and reproducing data of plural categories, and which records the data of plural categories in category-specific directories on a removable recording medium. The removable recording medium will therefore have a data structure in which data of different categories will be divided into category-specific directories. The recording and reproducing apparatus of this aspect of the present invention will include a micro-controller, or control micro-computer, and a working memory. The control microcomputer generates serial numbers for each particular file of digital data. The serial numbers are generated so that they will not be dependent on the category of the digital data, but on the chronological order of the digital data's recording. The serial number is used by the micro-controller to generate a file name for each file of digital data. When the recording and reproducing apparatus reproduces the digital data on the removable recording media, it can then reproduce the digital data in its chronological order rather than categorical order by ordering the filenames by their serial numbers in the working memory.

A removable recording medium is another aspect of the present invention. The removable recording medium has digital data of plural categories recorded on it. The digital data of any given category is recorded in the directory corresponding to that category. The files of digital data are recorded by a filename including a serial number generated in the order of the data recorded without dependency upon the categories.

BRIEF DESCRIPTION OF THE DRAWINGS

FIG. 4 shows a list of files recorded on a memory card re-arrayed in the sequence of the recording time.

DETAILED DESCRIPTION OF THE PREFERRED EMBODIMENTS

Figure 1:
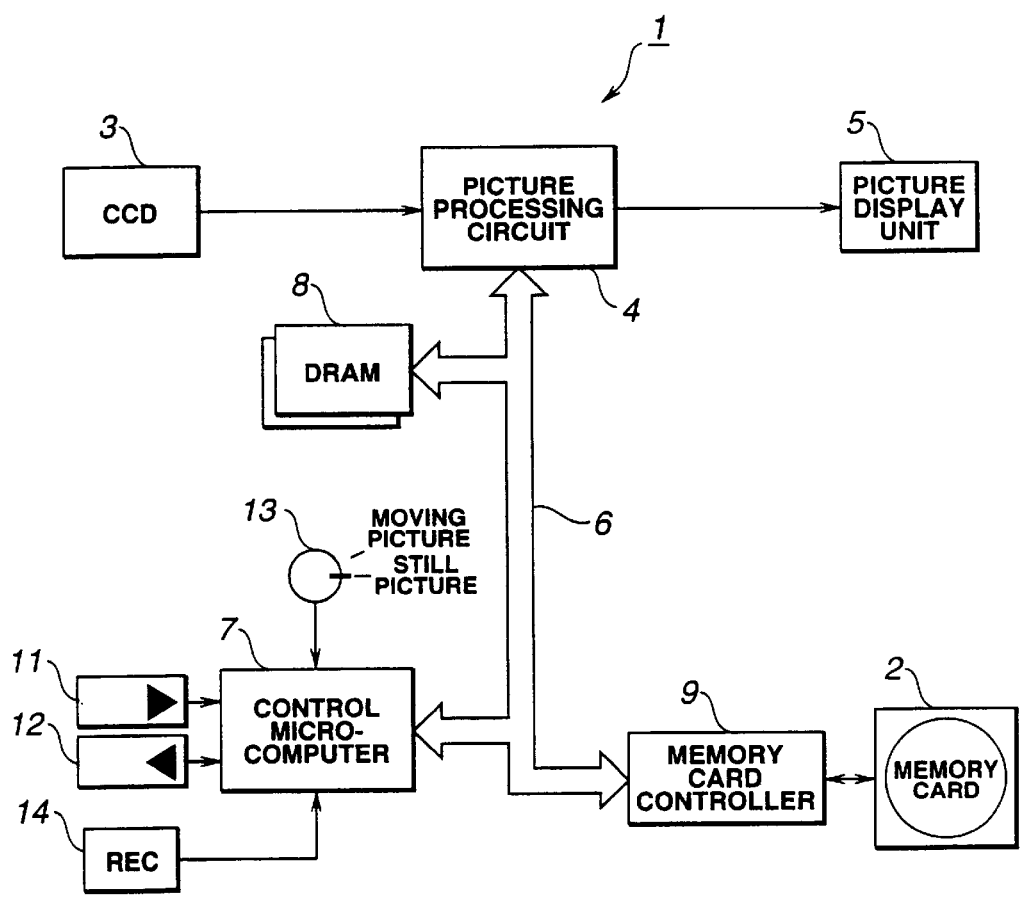
FIG. 1 is a block diagram of a digital camera device, one embodiment of the present invention.

A digital camera device 1 as shown in FIG. 1 is an embodiment of the present invention. The digital camera device 1 is configured to record still image data or moving picture data of an imaged object on to a memory card 2. The digital camera device 1 is also configured to reproduce and display the still image data or moving picture data recorded on the memory card 2.

The digital camera device 1 itself includes a CCD (charge-coupled device) 3, for imaging an object, a picture processing circuit 4 for processing signals obtained from the CCD 3, and a picture display unit 5 for demonstrating picture signals processed by the picture processing circuit 4. The digital camera device 1 also includes a control micro-controller (control micro-computer) 7, connected over a bus 6 to the picture processing circuit 4, a DRAM (dynamic random access memory) 8, connected to bus 6, and a memory card controller 9 connected to bus 6, and connected to memory card 2 when memory card 2 is mounted.

The picture processing circuit 4 processes imaging signals obtained on imaging with the CCD 3. For example, the picture processing circuit 4 digitizes and compresses the imaging signals from the CCD 3 to generate JPEG data, which is compressed data of a still image, and MPEG data, which is compressed data of a moving picture, to send and record these data on the memory card 2. The picture processing circuit 4 also processes the imaging signals from the CCD 3 to route the processed signals to the picture display unit 5 for real-time picture display.

The picture processing circuit 4 also reproduces data recorded on the memory card 2 to produce a picture on the picture display 5. For example, the picture processing circuit 4 expands the JPEG data, which is compressed data of a still image, and MPEG data, which is compressed data of a moving picture, to send the expanded data to the picture display unit 5 for displaying the picture thereon.

The picture display unit 5 is a display device within the apparatus or connected to it, such as a liquid crystal panel or an EVF (electric view finder).

The control micro-computer 7 performs various control operations, such as controlling the picture processing circuit 4 and controlling the data recording/reproduction for the memory card controller 9. The control micro-computer 7 receives user input and actuates various operations in response. In order to allow for user actuation, the control micro-computer 7 is connected to a series of control buttons and switches, which include a forward playback button 11, a reverse playback button 12, a changeover switch 13 for switching between the moving picture and the still image, and a record or shutter button 14.

The forward playback button actuates the control micro-computer 7 to reproduce the digital data in the reverse order in which it was recorded. The reverse playback button 12 actuates the control micro-computer 7 to reproduce the digital data in the order in which it was recorded. Each of these buttons progresses from the file that is currently being reproduced. The changeover switch 13 switches the digital camera device 1 between the moving picture recording mode and the still image recording mode in recording, and between the recording mode and the reproducing mode. If the changeover switch 13 is set to the moving picture recording mode, and the shutter button 14 is pressed by the user, the control micro-computer 7 actuates the recording of the moving picture data. If the changeover switch 13 is set to the still image recording mode, and the shutter button 14 is pressed by the user, the control micro-computer 7 actuates the recording of the still image data.

The DRAM 8 stores the compressed still image data and the compressed moving picture data generated by the picture processing circuit 4. The DRAM 8 also stores a list of the filenames of the data files recorded on the memory card 2. For example, on power up, the filenames of the data files recorded on the memory card 2 are read out and stored in the DRAM 8.

The memory card controller 9 performs control for data input/output operations for the memory card 2.

The memory card 2 is a non-volatile memory device that can be mounted on or dismounted from the digital camera device 1. The memory card 2 records data of plural categories. Such categories include still image files, moving picture files, speech files and computer data files.

The data of each respective category is stored in a directory specific to that particular category. This allows compatibility with respect to other devices that are able to handle data of only one category. This also allows for ease of handling of the data by a computer.

Figure 2:
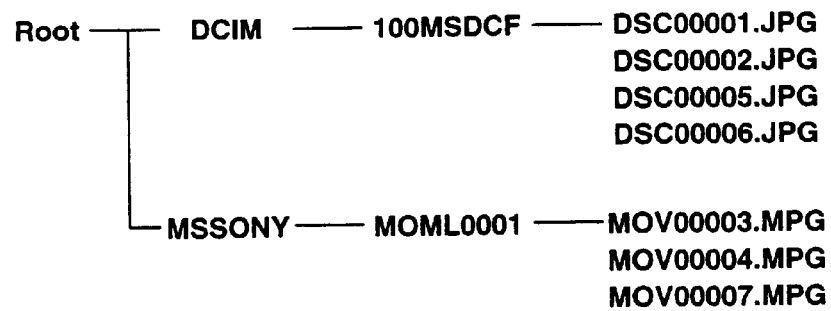
FIG. 2 shows a directory structure of a memory card employed by the digital camera device.

In this embodiment, memory card 2 has a file directory structure as shown in FIG. 2. The memory card 2 has, under the root directory, a sub-directory for still image files (DCIM) and a sub-directory for moving picture files (MSSONY). Under the DCIM directory, there is provided a sub-directory 100MSDCF. This subdirectory can be for still image files of a specific file format. Under the sub-directory 100MSDCF four still image files are shown as an example: DSC00001.JPG, DSC00002.JPG, DSC00005.JPG and DSC0006.JPG. Note that all these files are in the JPEG format. Under the MSSONY directory, there is shown a sub-directory MOML0001. This subdirectory can be for moving picture or video image files of a specific file format. Under this subdirectory three moving picture files are shown: MOV00003.MPG, MOV00004.MPG and MOV00004.MPG. Each of these files is in an MPEG format.

The filename in each file is made up of three alphabetical letters, five numerical figures and three extension letters. The three alphabetical letters denote file categories. The five numerical figures are serial numbers accorded in the file recording order. These serial numbers are assigned to files in the order they are recorded, independent of their file category. The extension "JPG" represents the file of still pictures compressed by JPEG and the extension "MPG" represents the file of moving pictures compressed by MPEG.

Figure 3:
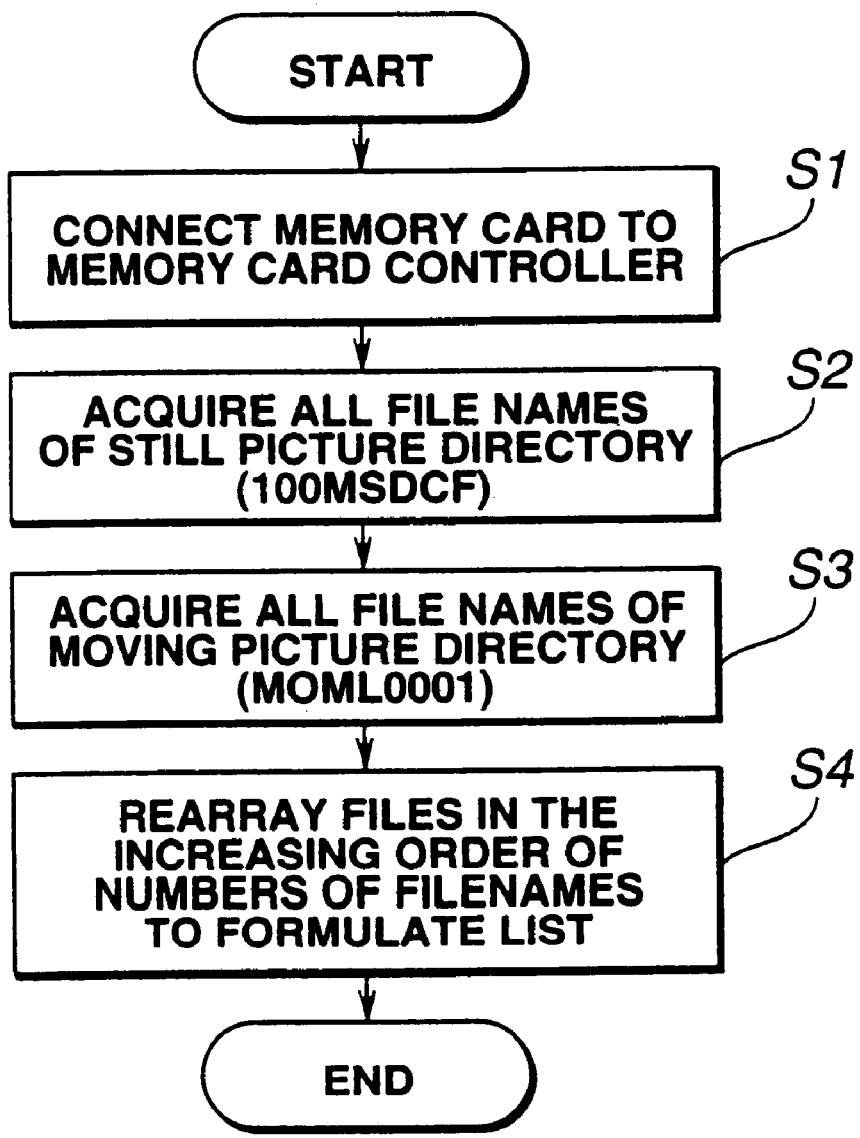
FIG. 3 is a flowchart showing the processing contents in the memory card connection in the digital camera device.

In operation, the memory card 2 is connected to the memory card controller 9 of the digital camera device 1, as shown in S1 of FIG. 3. Alternatively, the digital camera device 1 is powered up when the memory card is already connected. The control micro-computer 7 first copies all the file names listed in the still image directory DCIM on the memory card 2 through the memory card controller 9 to the DRAM 8, as shown in S2. In this example, all the still image data files reside in the sub-directory 100MSDCF Next, the control micro-computer 7 then copies all the file names listed in the moving picture directory MSSONY on the memory card 2 through the memory card controller 9 to the DRAM 8 as shown in S3. In this example, all the moving picture data files reside in the sub-directory MOML0001. The file names which would be accumulated in DRAM 8 by the control micro-computer 7 from the memory card 2 with the files described above are shown in FIG. 4A.

Next, the control micro-computer 7 sorts the file names accumulated in DRAM 8. The control micro-computer 7 re-arrays the file names by referring to the number portions of the acquired filenames. Specifically, the control micro-computer 7 re-arrays the file names in the increasing order of the number portion of the file names, as shown in S4. FIG. 4B shows a list of filenames that were created by performing such a sort on the files listed in FIG. 4A.

Since, as we shall see, these serial numbers embedded in the file names of the data files are assigned to the data files in chronological order, the sorted list will also be in chronological order, with the most recently acquired data file as the last on the sorted list.

Figure 5:
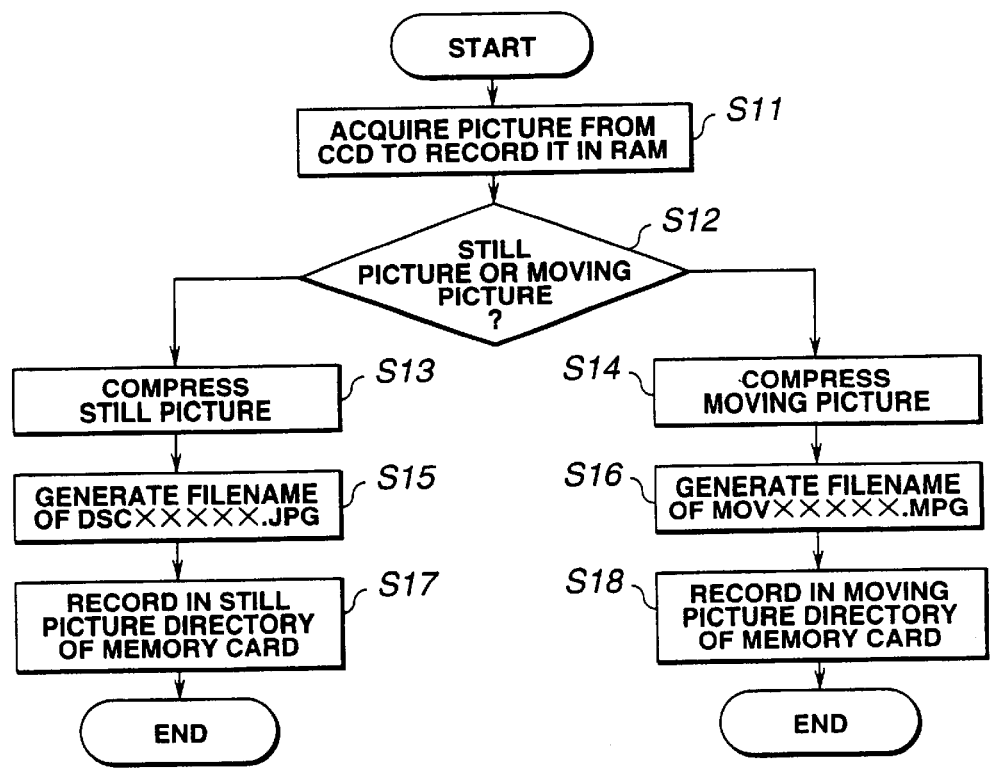
FIG. 5 is a flowchart showing the processing contents of the digital camera device at the time of recording.

In recording operation, as shown in FIG. 5, the changeover switch 13 is used to set the digital camera device 1 into a recording mode, either a still image recording mode or a motion picture recording mode. In recording mode, when the user pushes the shutter button 14, an image is photographed by the CCD 3, and the image data is stored in an uncompressed form in the DRAM 8, as shown in S11. The picture processing circuit 4 then checks to see if the changeover switch 13 has been set to the still image record mode or the moving picture record mode, as shown in S12. If the changeover switch 13 has been set to the still image record mode, the picture processing circuit 4 will then compress the image data using the JPEG format, as shown in S13. If the changeover switch 13 has been set to the moving picture record mode, then the data is compressed by the picture processing circuit 4 using the MPEG format, as shown in S14. In both theses cases the newly compressed data is still in the DRAM 8.

The control micro-computer 7 then generates the filenames for the compressed files stored in the DRAM 8, as seen in S15 or S16. Specifically, the control micro-computer 7 refers to the number portion of the last file of the file list stored in the DRAM 8 to generate the filename so that these number portion will be the next number. If the file list shown for example in FIG. 4b is recorded, the last number portion is "00007", so that the filename is generated with the last number portion will be "DSC00008.JPG" if the changeover switch 13 is set to the still image record mode (S15), or will be "MOV00008.MPG" if the changeover switch 13 is set to the moving picture record mode (S16). That is, the filenames are generated so that the number portions thereof represent the serial number indicating the recording order, without dependency on whether the file in question is a still image or a moving picture.

The control micro-computer 7 then records the compressed file recorded on the DRAM 8, along with the generated filename, in the memory card 2 via the memory card controller 9, as shown in S17 or S18. If the compressed file for recording is a still image file, the control micro-computer 7 records the file and filename under the still image directory (S17). In the example discussed above, the still image directory is DCIM. If the compressed file for recording is a moving picture, the control micro-computer 7 records the file and filename under the moving picture directory (step S18). In the example discussed above, the moving picture directory is MSSONY.

Figure 6:
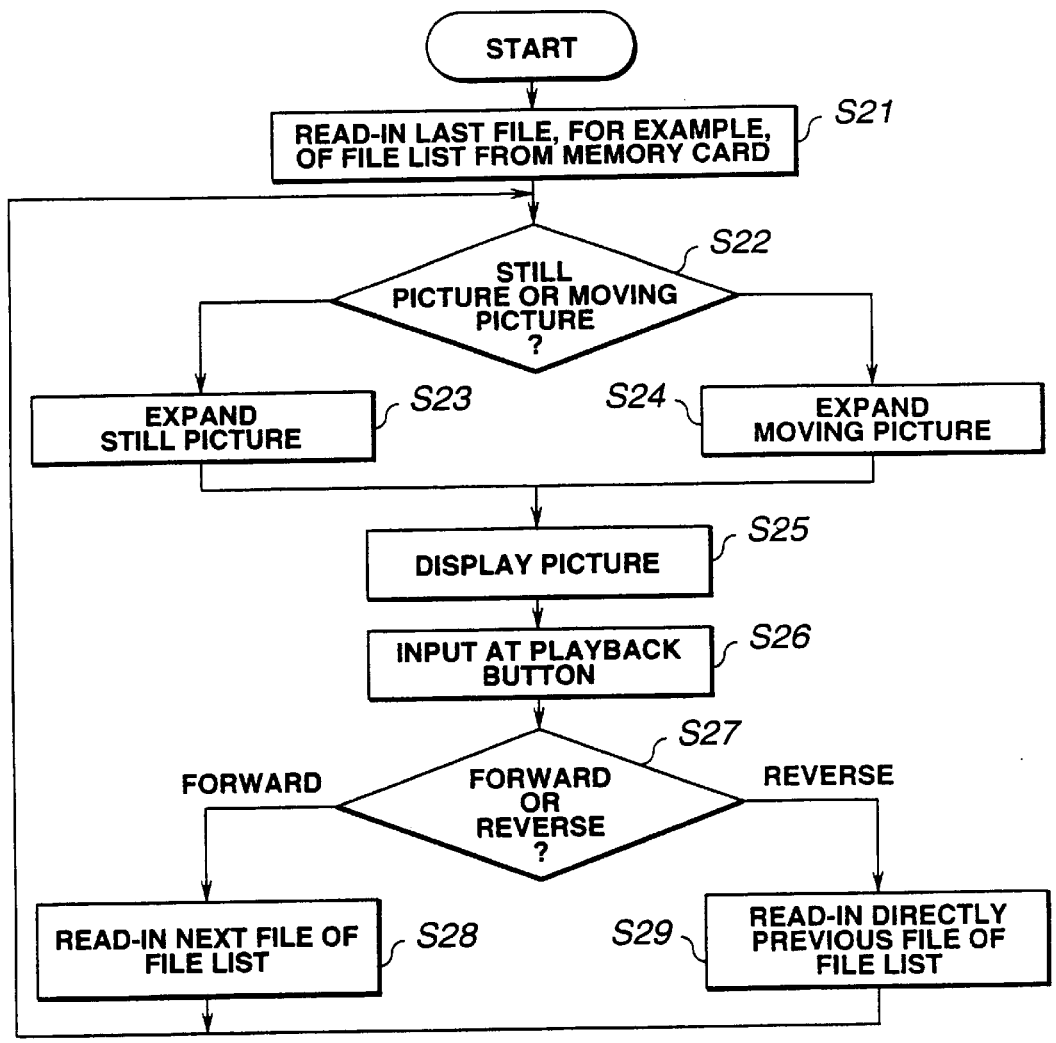
FIG. 6 is a flowchart showing the processing contents of the digital camera device at the time of reproduction.

In reproduction operation , as shown in FIG. 6, the digital camera device 1 is set to a reproduction (playback) mode through the changeover switch 13. The control micro-computer 7 reads out the file of the filename indicated at a pre-set position of the list stored in the DRAM 8, such as the last file or the first file, from the memory card 2, to store the read-out file in the DRAM 8 (step S21). The picture processing circuit 4 then refers to an identifier of the read-out file to verify whether or not the read-out file is a still image or a moving picture (step S22). If the read-out file is the still image, the picture processing circuit 4 performs the expanding processing for the still image (step S23). Using the example discussed above, the JPEG algorithm would be used for the expansion. If the read-out file is the moving picture, the picture processing circuit 4 performs the expanding processing for the moving picture (step S24). Using the example discussed above, the MPEG algorithm would be used for the expansion.

The picture processing circuit 4 then displays the expanded still image or expanded moving picture in the picture display unit 5 (step S25). The digital camera device 1 remains at a standstill until the user pushes the playback button 11 for the forward direction or the playback button 12 for the reverse direction (step S26), signaling the control micro-computer 7.

If the playback button 11 for the forward direction is pushed by the user, the control micro-computer 7 reads out from the memory card 2 the file indicated by the filename that is directly below, in the sorted filename list in DRAM 8, the filename of the file of the currently displayed picture (step S28). That is, the control micro-computer 7 reads out the file recorded temporarily directly after the currently displayed picture.

If the playback button 12 for the reverse direction is pushed, the control micro-computer 7 reads out from the memory card 2 the file indicated by the filename that is directly above, in the sorted filename list in DRAM 8, the filename of the currently displayed picture (S29). If the new file is read out, the control micro-computer 7 repeats the processing as from step S22.

Therefore, in this aspect of the present invention, the digital camera device 1 can reproduce data chronologically without dependency on the categories of the recorded files. With the present digital camera device 1, performing the above-described processing, it is possible to maintain compatibility with other devices capable only of handling data of a sole category, and to ease in operation on a computer, while it is simultaneously possible to reproduce the data easily in the chronological order it was recorded, without dependency upon whether the data was recorded as a still picture or a moving picture. Note that as the reproduction is done chronologically, there is no necessity of switching the directories, which facilitates the processing and reproduction.

In the recording and reproducing apparatus according to one aspect of the present invention, the chronologically generated serial numbers are included in the filenames, without dependency upon the categories. In reproduction, the files are reproduced in the order of the serial numbers, by referring to the serial numbers of the filenames. This renders it possible to maintain compatibility with other devices and ease in processing on the computer, as well as to reproduce data of plural categories chronologically without dependency upon the categories.

In the recording medium according to the present invention, data of plural categories can easily be reproduced chronologically at the same time as compatibility with other devices or ease in processing on the computer are assured.

The above embodiment of the present invention in the digital camera device 1 is but one embodiment of the present invention. Many alternative embodiments exist.

The memory card 2 discussed above is a removable piece of flash memory. In other words, it is a non-volatile solid state memory. Commercial examples of a memory card 2 include the Sony Memory Stick™. However, other non-volatile memory technologies and media could be implemented in the context of the present invention instead of a memory card. Such technologies includes removable hard drives and removable floppy magnetic media.

The embodiment disclosed above discusses JPEG files and MPEG files being recorded on the memory card 2. However, any still image file format could be used in the context of the present invention. Such still image file formats include the GIF file format, the TIFF file format, the PICT file format, the EPS file format, the PNG file format, the Photo CD file formats, and the FlashPix® file format. In the same way, any video or moving picture file format could be used in the context of the present invention. Such moving picture file formats include the QuickTime (.MOV) file format, the MPEG file format, and the AVI file format. Moreover, the picture processing unit 4 can at least be programmed to deal with some different file formats, including those as noted above.

The function of the display picture unit 5 could be performed by connecting the digital camera device 1 directly to a TV, computer CRT, or stand-alone LCD.

Another embodiment of the present invention would allow the user to select not just the mode of recording but the mode of replay. When a given mode was selected, the forward and backward playback buttons would step through the digital data files in a chronological fashion as before, but only those files of that given mode. For example, if the JPEG mode was selected, the JPEG files would be displayed in the order they were recorded, but not the MPEG files.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. A recording apparatus for recording digital data on a recording medium comprising:
    (a) data processing circuitry for processing digital data in a plurality of processing modes;
    (b) control circuitry for recording digital data from said data processing circuitry in one of a plurality of directories on said recording medium, wherein each one of said plurality of directories corresponds to one of said processing modes, and
    (c) wherein said control circuitry records a file name with each discrete recording of said digital data, said file name comprising a sequential number assigned in time sequence regardless of the directory in which said discrete recording of said digital data is recorded.

2. The recording apparatus of claim 1, wherein said recording medium is removably attached to said recording apparatus.

3. The recording apparatus as set forth in claim 2, wherein said file name further comprises characters indicating in which processing mode said discrete recording of said digital data was processed.

4. The recording apparatus as set forth in claim 2, wherein said recording apparatus determines the previously recorded file names of the digital data recorded on said recording medium before recording on said recording medium, and uses said previously recorded file names to generate a new file name to be assigned.

5. The recording apparatus of claim 4, further comprising a memory circuit for storing the previously recorded file names.

6. The recording apparatus as set forth in claim 5, further comprising a mode switch for engaging a particular one of said processing modes.

7. The recording apparatus set forth in claim 6, wherein one of said processing modes is compressing said digital data in to a JPEG format.

8. The recording apparatus set forth in claim 6, wherein one of said processing modes is compressing said digital data into an MPEG format.

9. A reproducing apparatus for reproducing digital data from a recording medium comprising:
    (a) data processing circuitry for processing discrete recordings of said digital data in a plurality of processing modes;
    (b) reproducing circuitry for reproducing said discrete recordings of said digital data recorded in a plurality of directories corresponding to said processing modes from said medium;
    (c) wherein said reproducing circuitry is capable of reproducing said discrete recordings of said digital data in an order in accordance with the sequential numbers in the file names of said discrete recordings of said digital data.

10. The reproducing apparatus as set forth in claim 9, wherein said recording medium is attached to said reproducing apparatus.

11. The reproducing apparatus as set forth in claim 10, wherein said file names further comprises characters indicating in which processing mode a discrete recording of said digital data was processed.

12. The reproducing apparatus as set forth in claim 10, wherein said reproducing apparatus determines the previously recorded file names of said discrete recordings of said digital data recorded on said recording medium before reproducing said discrete recordings said digital data.

13. The reproducing apparatus of claim 10, further comprising a memory circuit for storing the previously recorded file names which are reproduced.

14. The reproducing apparatus as set forth in claim 10, further comprising one or more direction switches for directing said reproducing apparatus to reproduce the discrete recording of said digital data corresponding to the file name which is either the next or the previously sequentially numbered file name.

15. The reproducing apparatus set forth in claim 10, wherein one of said processing modes is expanding said digital data out of a JPEG format.

16. The recording apparatus set forth in claim 10, wherein one of said processing modes is expanding said digital data out of a MPEG format.

17. A recording medium comprising,
    (a) discrete recordings of digital data in a plurality of directories, each particular directory corresponding to a particular processing mode that a discrete recording of said digital data was processed with, and
    (b) wherein said recording medium further comprises file names comprising sequential numbers assigned in time sequence with said discrete recordings of said digital data regardless of which one of said directories said discrete recordings of said digital data is in.

18. A recording method for recording digital data on a recording medium comprising the steps of:
    (a) processing digital data in one of a plurality of processing modes;

(b) recording processed digital data in one of the plurality of directories in said recording medium, wherein each one of the plurality of directories corresponds to one of said plurality of processing modes; and (c) recording a file name comprising a sequential number assigned in a chronological fashion independent of which processing mode processed the digital data.

19. The recording method as set forth in claim 18, wherein said file name further comprises characters indicating the processing mode.

20. The recording method as set forth in claim 18, further comprising the step of reproducing the file names recorded on said recording medium before the recording and determining the next file name to be assigned.

21. The recording method as set forth in claim 20, further comprising the step of sorting the file names reproduced in accordance with said sequential number, selecting the highest number and assigning the next number.

22. The recording method of claim 18, wherein one of said processing modes is compressing said digital data into a JPEG format.

23. The recording method of claim 16, wherein one of said processing modes is compressing said digital data into a MPEG format.

24. A reproducing method for reproducing digital data from a recording medium, wherein the digital data is recorded as discrete recording in a plurality of directories, with file names containing sequential numbers assigned to the filenames chronologically, comprising the steps of:

(a) reproducing in volatile memory the file names of the discrete recordings of the digital data recorded on the recording medium;

(b) sorting the file names in the order of the sequential numbers in the file names irrespective of what processing mode the corresponding discrete recording of digital data had been processed in;

(c) processing a discrete recording of the digital data in one of a plurality of processing modes, wherein the discrete recording was determined to correspond to either the previous or next file in the sorted file names compared to a previously displayed discrete recording of digital data;

(d) displaying the discrete recordings of the digital data in the order they were processed.

25. The reproducing method of claim 24, wherein said file name further comprises characters indicating the processing mode.

26. The reproducing method of claim 24, wherein one of said processing modes is expanding said digital data out of a JPEG format.

27. The reproducing method of claim 24, wherein one of said processing modes is expanding said digital data out of a MPEG format.

28. A reproducing method for reproducing digital data from a recording medium, wherein the digital data is recorded as discrete recording in a plurality of directories, with file names containing sequential numbers assigned to the filenames chronologically, comprising the steps of:

(a) selecting which processing mode of digital data to display;

(b) reproducing in volatile memory the file names of the discrete recordings of the digital data recorded on the recording medium;

(c) sorting the file names first by the processing mode used to process the corresponding digital data; and then by the order of the sequential numbers in the file names;

(c) processing a discrete recording of the digital data in the selected processing mode, wherein the discrete recording was determined to have been processed in the selected processing mode, and to correspond to either the previous or next file in the sorted file names compared to a previously displayed discrete recording of digital data;

(d) displaying the discrete recordings of the digital data in the order they were processed.

* * * * *

UNITED STATES PATENT AND TRADEMARK OFFICE
CERTIFICATE OF CORRECTION

| | | |
|---|---|---|
| PATENT NO. | : 6,763,182 B1 | Page 1 of 1 |
| APPLICATION NO. | : 09/538813 | |
| DATED | : July 13, 2004 | |
| INVENTOR(S) | : Katsumi Endo and Shiro Miyagi | |

It is certified that error appears in the above-identified patent and that said Letters Patent is hereby corrected as shown below:

In the Claims

Claim 3, Col. 7, Line 59, "in which processing mode said discrete" should read --a processing mode in which said discrete--.
Claim 9, Col. 8, Line 24, "with the sequential numbers in the file" should read --with sequential numbers in file--.
Claim 11, Col. 8, Line 32, "in which processing mode a discrete" should read --a processing mode in which a discrete--.

Signed and Sealed this
Twelfth Day of January, 2016

Michelle K. Lee
*Director of the United States Patent and Trademark Office*